United States Patent [19]

Tatemichi

[11] Patent Number: 4,605,530
[45] Date of Patent: Aug. 12, 1986

[54] OPERATING METHOD FOR NUCLEAR POWER PLANTS

[75] Inventor: Shinichiro Tatemichi, Yokohama, Japan

[73] Assignee: Tokyo Shibaura Denki Kabushiki Kaisha, Kawasaki, Japan

[21] Appl. No.: 697,437

[22] Filed: Feb. 4, 1985

Related U.S. Application Data

[63] Continuation of Ser. No. 487,449, Apr. 21, 1983, abandoned.

[30] Foreign Application Priority Data

May 4, 1982 [JP] Japan .................................. 57-73368

[51] Int. Cl.$^4$ .............................................. G21C 7/06
[52] U.S. Cl. .................................................. 376/237
[58] Field of Search ............... 376/215, 216, 217, 219, 376/224, 236, 237

[56] References Cited

U.S. PATENT DOCUMENTS 3,207,669  9/1965  Fawcett et al. .................... 376/216
4,129,475  12/1978  Spurgin et al. .................... 376/238

FOREIGN PATENT DOCUMENTS

57-22587  2/1982  Japan .................................. 376/236

Primary Examiner—Deborah L. Kyle
Assistant Examiner—Richard W. Wendtland
Attorney, Agent, or Firm—Oblon, Fisher, Spivak, McClelland & Maier

[57] ABSTRACT

An operating method for a nuclear reactor power plant having control rods for controlling the power level thereof, upon an occurrence of a failure, comprising the steps of: determining the type of failure; selecting control rods from the outermost peripheral region of said nuclear reactor; selecting control rods from those control rods in the region inside the outermost peripheral region which are in a fully withdrawn position during normal operation of said nuclear reactor power plant; subjecting the control rods selected from the outermost peripheral region and the region inside the outermost peripheral region to a scram process, whereby the power level of said nuclear reactor power plant is controlled in accordance with the type of failure.

2 Claims, 13 Drawing Figures

OPERATING METHOD FOR NUCLEAR POWER PLANTS

This application is a continuation of application Ser. No. 487,449, filed Apr. 21, 1983 now abandoned.

BACKGROUND OF THE INVENTION

1. Field of the Invention

This invention relates to an operating method for a nuclear power plant, and more particularly to an operating method for a nuclear power plant capable of maintaining continuous operation of the nuclear reactor by scraming the previously selected control rods (hereinafter referred to as the selected control rods) when an in-house or outside power failure or decrease in power occurs which results in a reduction in demand of a boiling water reactor (hereinafter referred to as BWR) type nuclear power plant.

2. Description of the Prior Art

The technical term "scram" means rapid-insertion of the control rods.

In general, a continuous isolated grid operation (in-house separate operation) is maintained during an electric grid system failure, by an operating method capable of maintaining continuous operation of the nuclear reactor without an interruption thereof. This can be achieved, upon occurrence of the failure, by tripping primary loop recirculation system pumps, by scraming the selected control rods so as to reduce the nuclear reactor power level, and by rapidly opening the turbine bypass valves so as to bypass steam generated from the nuclear reactor into a condenser. Then the nuclear reactor is operated from about 20% to 30% of its rated power level.

However, the selected control rods subjected to the scram process are required to be set by an operator at every burnup point in accordance with the result of nuclear-thermal hydraulic analysis previously made at every burnup point. Moreover, in case of power recovery of the nuclear power plant after repair of the failure, the selected control rods which were subjected to the scram process should be withdrawn only after the nuclear reactor power has further been lowered in order to conform with operation procedures for fuel preconditioning, because the nuclear reactor power distributions are inevitably distorted resulting in adverse influence on the fuels, and at the same time such cumbersome and complicated control rod sequences deteriorate the availability factor of the nuclear power plant.

In the conventional selected control rod inserting method, there are also such disadvantages that the inserting method is implemented only upon the occurrence of an outside power failure affecting the nuclear power plant, but not in the case of an in-house power failure, (i.e., upon occurrence of a failure such as an accidental stoppage of the nuclear reactor feedwater pump, the nuclear power plant becomes incapable of maintaining continuous operation of the generator along with an abrupt decrease in the nuclear reactor power level).

Furthermore, in a status under which the selected control rod insertion has determined the natural circulation of the coolant and a lowered power level, there are also other well-known disadvantages such that the axial power distribution of the reactor core is downwardly distorted due to the following three causes:

(i) In the case of a lower flow rate within the core, such as natural circulation of the coolant. Voids generated in the upper part of the core are not sufficiently swept away, so that neutron slow-down effects are insufficiently obtained, consequently the power developed in the lower part of the core becomes correlatively greater.

(ii) The thermal source of a feedwater heater is supplied by steam extracted from a turbine; however, when such steam is bypassed into a condenser by abrupt opening of the turbine bypass valve, the thermal source of the feedwater heater is interrupted, so that water with relatively higher subcooling is fed into the core. This causes the axial boiling start-up point within the core to be raised. As a result, neutron slow-down effects in the lower part of the core are enhanced, thus the power in the lower part of the core is increased.

Figure 1:
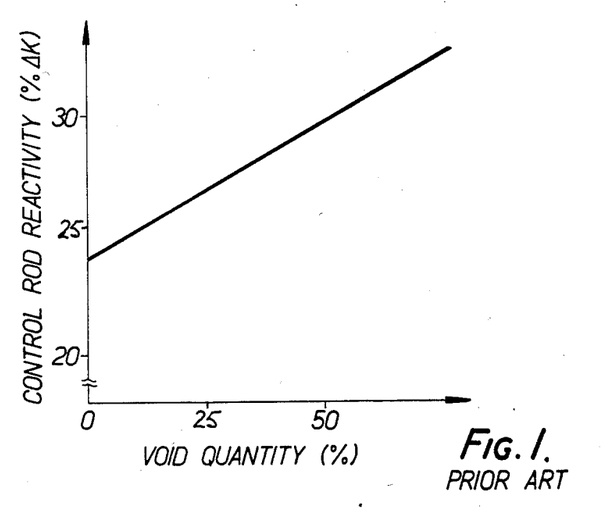
FIG. 1 is a graph illustrating the relationship between void quantity and control rod reactivity of a prior art nuclear reactor.
Figure 2:
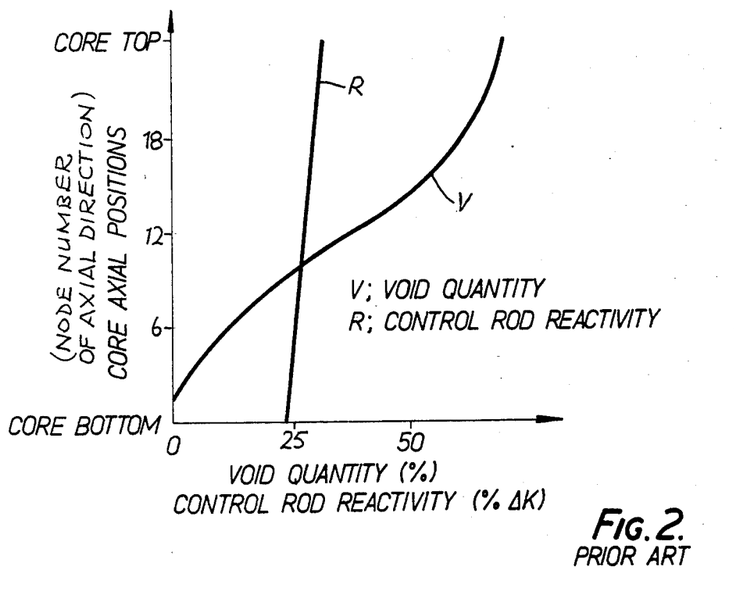
FIG. 2 is a graph illustrating the dependency of the control rod reactivity R and the void quantity V on the core axial positions of a prior art nuclear reactor.

(iii) As shown in FIGS. 1 and 2, the higher the void quantity in the core, the greater the control rod reactivity, so that when the selected control rods are fully inserted, the negative reactivity effects caused by the selected control rods become greater in the upper part of the core and smaller in the lower part of the core. Therefore, when the selected control rods are subjected to a scram process to a fully inserted position, the reactor power distribution becomes downwardly distorted.

As described above, there are several interactively related causes, so that when the selected control rods are subjected to a scram process, the axial power distribution tends to be excessively downwardly distorted.

When the power peaking in the lower part of the core becomes greater, this adversely affects the core channel stability, which will be described in greater detail hereinafter.

When analyzing the stability of such a large-scale nonlinear type system as a BWR type nuclear power plant, the stability of the constituent elements or subsystems should be first be examined. Then the stability of the whole system consisting of combinations of such elements and subsystems should be examined.

For example, the thermal hydraulic stability of each individual channel's (flow passage) within the core may be examined to confirm the inherent stability (i.e. the channel stability) thereof.

Next, these channel stabilities are hydraulically combined, further combined with the nuclear characteristics and thermal transfer characteristics within the core, and then the stability of the core (i.e. "core stability") will be examined.

The channel stability will be explained with respect to a BWR type nuclear reactor which is provided with several hundreds of fuel assemblies installed within the core thereof, such that the respective fuel channels are arranged to form parallel channels. With such a design, the influence of the flow rate oscillation from even a single channel is absorbed by numerous channels surrounding the flow oscillation generating channel, so that no change in pressure appears at the inlet or the outlet of the core.

In the above-described heated two-phase flow channel, it may be recognized that even when the quantity of heat is constant, flow oscillation thereof can be produced.

The stability of such a two-phase flow channel has so far been studied in various aspects, and the instabilities of various kinds have been recognized, and also systematically classified.

In accordance with such classifications, one of the most common types of wave oscillations which affects channel stability and which will now be discussed is a so-called density wave oscillation. The mechanism of such oscillation is, in short, such that it is derived from the transfer delay and the feedback effects of such variables present within the channel as flow rate, density (void fraction) and pressure loss. One feature of such a mechanism is that the period of oscillation has a close relationship to the time in which the density waves within the flow (or propagation waves of void fraction disturbances) pass through the channels. Such oscillation was previously known as flow-rate void-feedback instability or time-delay instability, however, on the basis of the aforementioned features, is presently known as density wave oscillation.

Figure 3:
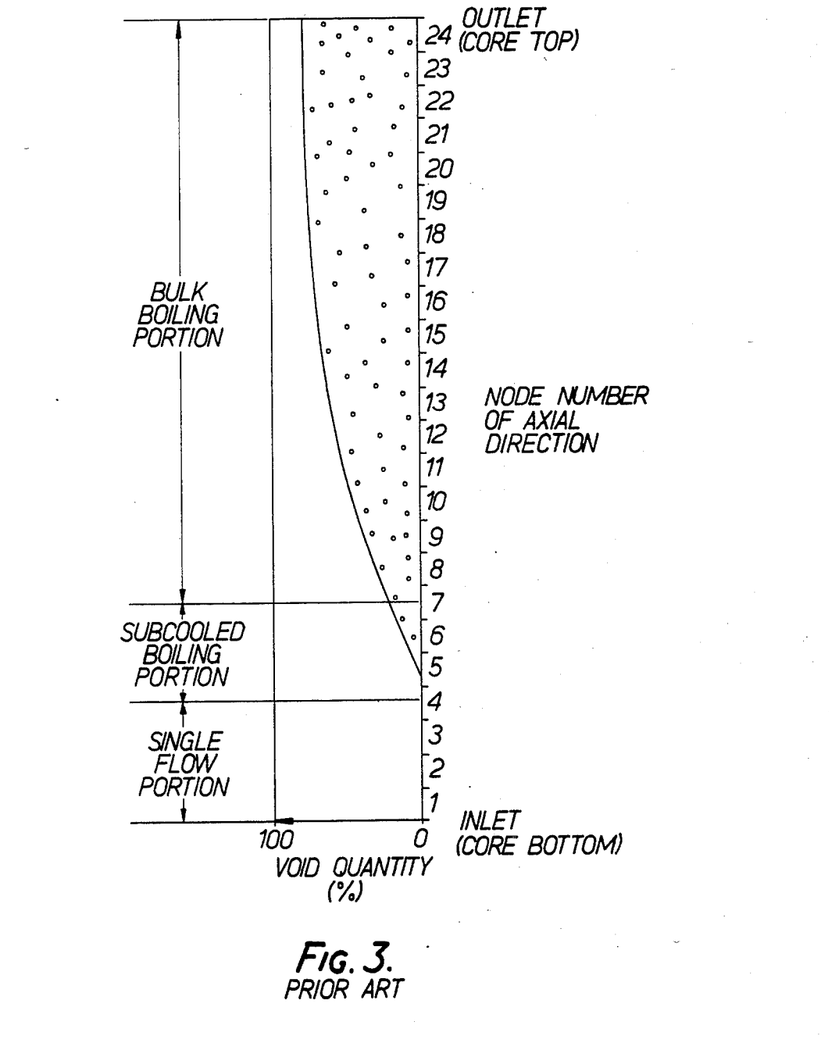
FIG. 3 shows a simulation diagram of the two-phase flow in a prior art nuclear reactor channel.

FIG. 3 shows a prior art BWR fuel channel provided with an inlet, a single phase flow portion, a subcooled boiling portion, a bulk boiling portion and an outlet. In the subcooled boiling portion, although enthalpy of water has not reached saturation enthalpy thereof, there exist steam bubbles, while in the bulk boiling portion, water has reached the saturation enthalpy thereof. Hereinafter, the mechanism of the state in which the oscillation occurs will be described in more detail.

Although for simplicity's sake, the subcooled boiling portion is omitted, no problem exists because the discussion is made in regard to a qualitative understanding.

Now, assume that the inlet flow rate of the channel is in oscillation, and that this oscillation produces a propagation along the flow of enthalpy disturbance with respect to the single phase flow portion. The boiling boundary (hereinafter refer to as BB) at which the temperature of the water reaches saturation oscillates because of the enthalpy disturbance. Since the flow rate and the length of the single phase flow portion oscillate, pressure loss within the single phase flow portion also oscillates. The oscillation of BB, that is, the oscillation of the void fraction or quality thereat, propagates along the flow, and at the same time, causes the flow velocity within the two-phase flow portion to produce disturbance. The void fraction and flow velocity disturbances, in conjunction with the length of oscillation of the two-phase flow portion, interactively produce the pressure loss disturbance within the two-phase flow portion.

Here, the entire pressure loss of the channel is given externally as a boundary condition, which is, in this case, a constant determined by several hundreds of other channels. Thus, the pressure loss disturbance within the two-phase flow portion effects the single-phase flow portion by a pressure loss change identical thereto in magnitude and reverse thereto in polarity. This enhances the firstly assumed hypothetical oscillation in the inlet flow velocity (in case of instability), or attenuates the same (in case of stability).

More detailed studies as to the case of a critical oscillation will be described hereinafter. In this case, a pressure loss change within the single-phase flow portion becomes identical in magnitude and reverse in polarity to that within the two-phase flow portion. Thus, with respect to the operating conditions of the BWR, the pressure loss change of the single phase flow portion is substantially in-phase with respect to the inlet flow rate change, while on the other hand, the pressure loss change of the two-phase flow portion is substantially in-phase with respect to the outlet flow rate change. Therefore, the flow rate, in this case, has a considerable amount of delay between the inlet phase and the outlet phase. Such a phase delay does not appear in a noncompressible single phase flow, and it is caused by a greater density change along the flow within the boiling channel. Namely, water that entered the channel with a greater inlet flow rate should pass through a longer distance before it reaches a saturated temperature because of the greater velocity thereof. Consequently, BB shifts toward the downstream. In the boiling portion, this is propagated as the negative void fraction disturbance, thereby causing the density flow rate to be propagated as a positive disturbance due to the density difference between water and steam.

As a result, this functions to increase the pressure loss of the boiling portion, to decrease the pressure loss of the single phase flow portion, and to decrease the inlet flow rate. This explains why half the period of oscillation becomes substantially equal to the time during which the fluid passes through the channel.

Under such conditions, should the pressure loss of the two-phase flow portion be increased, the pressure loss change of the two-phase flow portion is increased; and thereby increases the instability of the channel. On the other hand, a decrease in the size of the opening in the channel inlet orifice lowers the gain of the inlet flow rate change derived from the pressure loss change of the single-phase flow portion which is caused by the pressure loss change of the boiling portion, thereby causing stability to be enhanced. These tendencies have experimentally been confirmed.

When power peaking in the lower part of the core becomes greater, the void factor is increased, the pressure loss of the two-phase flow portion becomes greater, and the instability of the channel is increased.

Next, a detailed explanation of core stability will be described.

After the channel stability is assured, the core stability of a core having several hundreds of collective channels may be examined. In this case, it may be considered that the thermal hydraulic characteristics of the channels and the nuclear reactor core characteristics derived from the void reactivity coefficient are combined, thereby causing the core to become unstable. Here, the whole core is simulated by grouping the numerous fuel channels into several groups whose thermal-hydraulic characteristics are similar.

The thermal-hydraulic dynamic characteristics as to the respective fuel channels are derived from mathematical models of the previously described channel stability. Here, the channel flow rate and the void factor are produced with respect to the channel pressure loss and the input of thermal flow bundle. Now, the sum of channel flow rates becomes the core flow rate, and the dynamic characteristic models with respect to the primary loop recirculation system are required so that the pressure change of the core inlet plenum may be obtained. Finally, the void fraction of the respective channels are multiplied by the void reactivity coefficient, and summed up, then the reactivity change of the whole core is obtained, which, in turn, becomes the input of the core thermal characteristic and constitutes a feedback loop.

Therefore, in this case, the stability of the core is similar to that of the conventional feedback system, and readily appreciable.

Similar to the case of channel stability, when the axial power peaking in the lower part of the core becomes greater, the void fraction increases, and the feedback gain of the void reactivity is enhanced, whereby the instability of the core is increased.

As described above, when the axial power peaking in the lower part of the core becomes greater, the void quantity within the channel of the core increases, and the pressure loss and the void quantity of the two-phase flow is then increased. As a result, when minute disturbances occur within the channel flow rate, the flow rate disturbance delay caused by the void becomes greater, then the oscillation tends to readily continue. Also with regard to reactivity, the void reactivity is increased and a tendency towards instability emerges.

SUMMARY OF THE INVENTION

Accordingly, one object of this invention is to provide a novel operating method for a nuclear reactor power plant which, upon occurrence of a failure, rapidly shifts to an isolated grid operation and performs smooth recovery of the nuclear reactor power after failure recovery without having an adverse thermal effect on the nuclear fuel assemblies.

Another object of this invention is to provide a novel operating method for a nuclear reactor power plant which maintains continuous operation of the nuclear reactor upon occurrence of an in-house failure by abruptly lowering the nuclear reactor power level, retaining the continuous operation in the isolated grid operation without deteriorating the stability thereof, and recovering in a short time the pre-failure power level while assuring that the thermal margin of the fuel even in the process of recovery after repairs of the failure is maintained.

According to one aspect of this invention, there is provided an operating method of a nuclear power plant capable of, upon occurrence of a failure, lowering of the nuclear reactor power by subjecting previously selected control rods to a scram process, the selected control rods being selected from that portion of the control rods installed in the outermost peripheral region of the core and from those control rods installed in the region inward from the outermost periphery and fully withdrawn during normal operation.

BRIEF DESCRIPTION OF THE DRAWINGS

Various other objects features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 4:
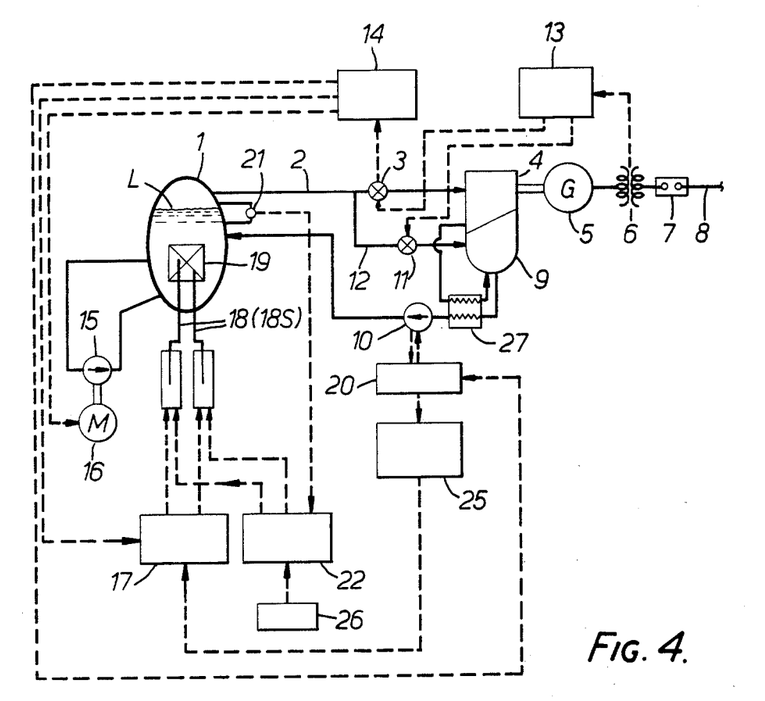
FIG. 4 is a schematic diagram illustrating a nuclear reactor power control system according to the present invention.

Referring now to the drawings, wherein like reference numerals designate identical or corresponding parts throughout the several views, and more particularly to FIG. 4 thereof, the nuclear reactor 1 generates steam which is supplied through a main steam line 2 having a main steam control valve 3 into a steam turbine 4 so as to maintain the same rotation of the turbine 4 that is imparted to an electric generator 5 wherein it is converted into electricity, then transmitted via a main transformer 6 and a main interrupter 7 to a power transmission system (an electric grid system) 8. On the other hand, the steam spent within the turbine 4 is condensed within a condenser 9, and therafter returned into the nuclear reactor 1 through a feedwater heater 27 by means of a feedwater pump 10. A bypass line 12 provided with a bypass valve 11 is connected between the main steam line 2 and the condenser 9 so as to bypass the main steam control valve 3 and the turbine 4. The steam passed through the bypass line 12 is also condensed within the condenser 9. The nuclear reactor 1 also has a power controlling apparatus—primary loop recirculation pumps 15 and control rods 18.

In the BWR type nuclear power plant constructed in the above-described manner, should a failure occur on the electric grid system 8 or in the electric generator 5, the main interrupter 7 is interrupted so as to disconnect the main transformer 6 from the electric grid system 8, and an "open" signal from the main transformer 6 is supplied into a load-shutdown detection device 13. When the "open" signal from the main transformer 6 is detected by the load-shutdown detection device 13 which, in turn, generates a load shutdown signal so as to abruptly close the main steam control valve 3, and at the same time to abruptly open the bypass valve 11. As a result, the steam to be led into the turbine 4 from the nuclear reactor 1 is abruptly interrupted by means of the main steam control valve 3, and fed into the condenser 9 through the bypass line 12.

On the other hand, the abrupt closing of the main steam control valve 3 is detected by a main steam-control-valve abrupt-close detection device 14, which, in turn, causes a primary loop recirculation pump motor 16 that drives a primary loop recirculation pump 15 to abruptly be tripped, and also causes a selected control rod inserting device 17 to function so as to subject the selected control rods 18S to a scram process into the reactor core 19. This causes the power level of the nuclear reactor 1 to be lowered. A signal from the main steam-control-valve abrupt-close detection device 14 is also supplied into a feedwater pump control device 20 which, in turn, causes one or a plurality of the nuclear feedwater pumps 10 to be tripped, thereby causing the nuclear reactor 1 to shift into an in-house separate operation (isolated grid operation).

Moreover, in order to assure safety of the nuclear reactor 1, there is provided a water level detector 21 which functions, for example, when water level L within the reactor 1 is lowered to a predetermined limit value, to generate a water-level lower-limit signal that causes a scram apparatus 22 to operate so as to subject all of the control rods 18 to a scram process into the core 19 that has many fuel assemblies, whereby the nuclear reactor 1 decreases the power.

In the commercial BWR type nuclear reactor, as described above, upon occurrence of a failure in the electric grid system 8 or in the electric generator 5, the bypass valve 11 is abruptly opened, and the primary loop recirculation pump 15 is tripped, then the selected control rod inserting device 17 operates so as to subject the selected control rods 18S to a scram process into the core 19 whereby the power of the nuclear reactor 1 is lowered, and while at the same time, the rise of water level within the nuclear reactor 1 caused by stoppage of the primary loop recirculation pump 15 is suppressed by stoppage of the feedwater pump 10, whereby the nuclear reactor 1 is caused to shift into the isolated grid operation in a secured and stable manner.

In practice, after the load shutdown has been made, during the period up to the time the bypass valve 11 is opened, the main steam control valve 3 is closed, so that pressure is abruptly raised, and the void within the core 19 is distorted, thereby drastically causing the neutron flux to increase. On the other hand, the steam extracted from the turbine 4 is utilized as a thermal source to the feedwater heater 27. However, after the load shutdown, the turbine bypass valve 11 is abruptly opened so as to bypass the steam from the nuclear reactor 1 into the condenser 9, so that the thermal source of the feedwater heater 27 is lost, and water of higher subcooling is fed into the core 19. Also, the voids within the core 19 are distorted, thereby increasing the reactor power level. To cope with the above-mentioned phenomena, firstly it is required to apply the negative reactivity such that the power rise of the post load shutdown can be appropriately suppressed so as to sufficiently assure the fuel integrity. Secondly, it is required that the isolated grid operation maintains a power level of approximately 10% of the rated power. The former determines the lower limit of the negative reactivity quantitity to be applied, and the latter the upper limit thereof, respectively.

To meet such requirements in terms of reactivity, the insertion of only those control rods installed in the outermost peripheral region is insufficient, so that the control rods installed in the region inside the outermost periphery are also required to be subjected to a scram process as selected control rods.

Figure 5:
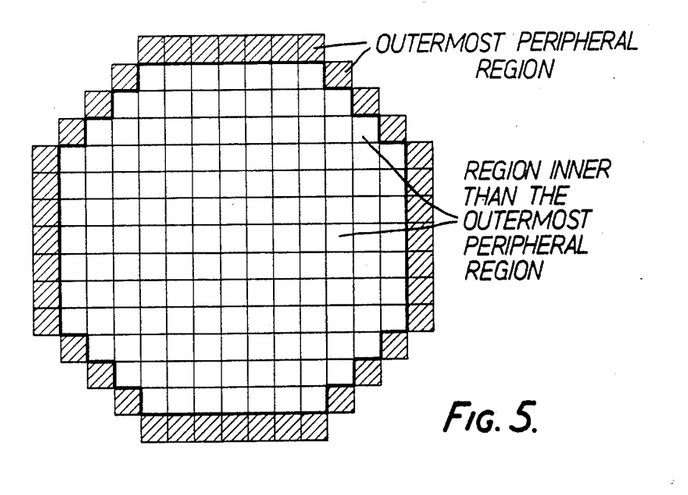
FIG. 5 is a plan view illustrating an example of selected control rods according to the present invention.

According to the present invention, as shown in FIG. 5, the control rods within the reactor core are classified into two groups such as those in the outermost peripheral region and those in the region inside the outermost periphery.

The selected control rods are determined in the following way in each cycle of the nuclear power plant, so the selected control rods are different for each cycle.

For the outermost periphery:

(i) Directly adjacent control rods are not selected. (If directly adjacent rods are selected, the distortion of neutron flux becomes large. This effect is the same which may occur inside the outermost periphery.)

(ii) The most preferred method is to select alternate control rods. (Of all the rods in the outer peripheral region are selected, the thermal condition in the inner region becomes severe.)

For the region inside the outermost periphery:

(iii) The directly adjacent control rods which are fully withdrawn are not selected.

(iv) The control rods that are directly adjacent to partially inserted rods during normal operation are not selected.

(v) The selected control rods are determined so as to be distributed uniformly in the core.

In this manner, the operator determines the selected rods and then the rod pattern is analyzed by computer to confirm its safety. After the above procedure, the position of each of the selected control rods is set in the selected control rod inserting device 17 in each cycle before operation.

In the case of BWR type power plant of 1.100 MWe class, for example, on the basis of the above-described requirements of upper and lower limits of the negative reactivity to be applied, all the control rods in the outermost peripheral region (twenty rods are selected) and four to fourteen control rods from the rods inside the outermost peripheral region are usually selected, respectively. Namely, this supplements the lack of negative reactivity quantitiy derived from the outermost selected control rods with the insertion of the control rods in the full-out position in the region inside the outermost periphery.

Figure 6A:
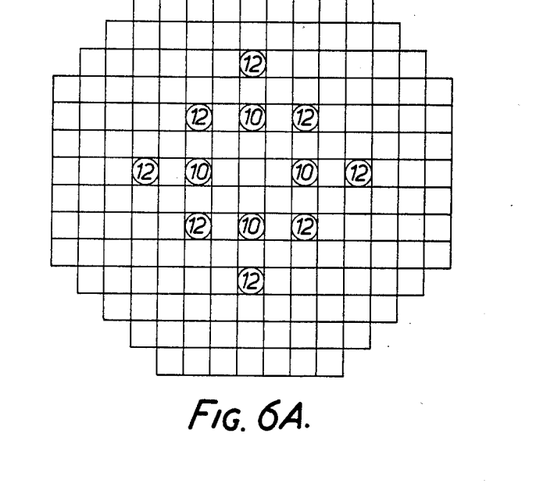
FIG. 6A is a plan view illustrating a control rod pattern during the normal power operation of the system of the present invention.
Figure 6B:
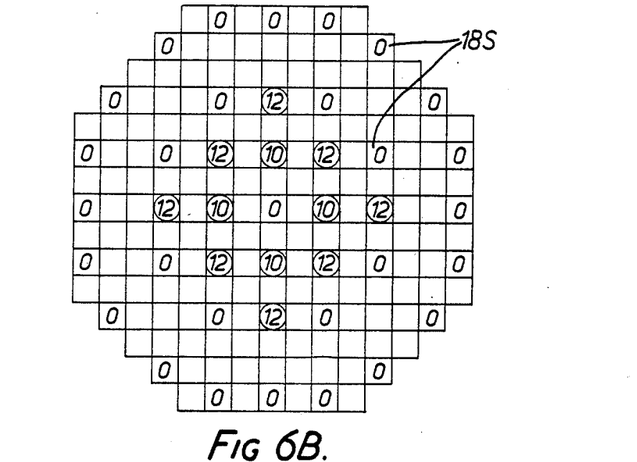
FIGS. 6B, 6C, 6D and 6E are plan views illustrating various control rod patterns formed after the selected control rods of FIG. 6A are subjected to a scram process according to the present invention.
Figure 6C:
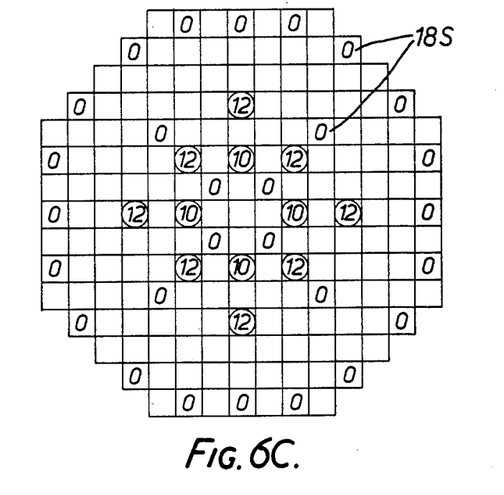
Figure 6D:
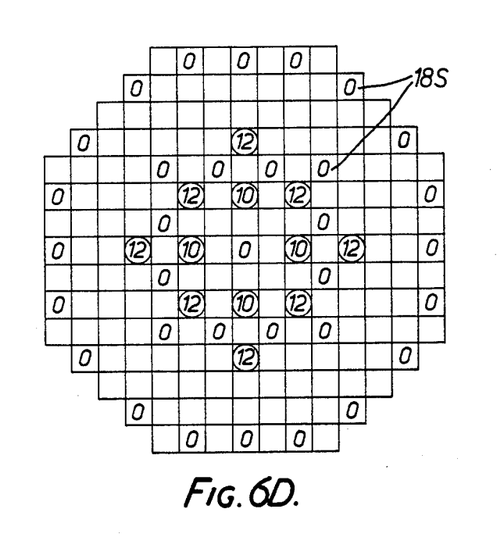
Figure 6E:
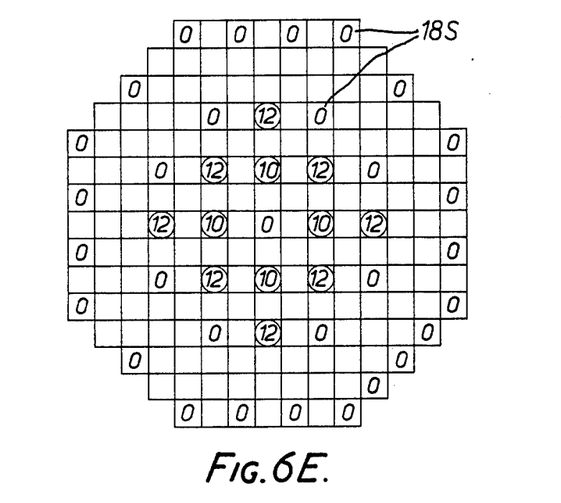

FIGS. 6A, 6B, 6C, 6D and 6E show one embodiment according to the present invention illustrating two control rod insertion patterns before and after insertion of the selected control rods 18S. FIG. 6A illustrates the control rod pattern during the normal operation, FIGS. 6B, 6C, 6D and 6E show the pattern thereof after the selected control rods 18S have been subject to a scram process. Numerals in the pattern designate the withdrawn notch numbers, that is, 48 for a full-out position, 0 for a full-in position and blank also for a full-out position, respectively. The control rods 18 (the notch number is enclosed by the circle), partially inserted during the normal operation, are not moved throughout the entire procedures, and is an important and novel feature of the present invention.

The control rods determined in the above-described manner are utilized as the selected control rods and operated by the selected control rod inserting device 17.

The feedwater pump control device 20 is provided with the feedwater-pump abnormal-operation detecting device 25 connected thereto (refer to FIG. 4). When a sufficient amount of feedwater to meet the nuclear reactor power is unable to be maintained due to a failure in any of the feedwater pumps 10, the feedwater pump abnormal-operation detecting device 25 detects the abnormalities, thereby causing the select control rod inserting device 17 to operate whereby a portion of or all of the control rods in the outermost periphery are subjected to a scram process into the core 19. Further, when the scram (emergency shutdown) device 22 receives a signal indicating an insufficient water level of the nuclear reactor 1 as detected by the water level detector 21 or other signals from the emergency detection device 26, the scram device 22 functions to subject all of the control rods to a scram into the reactor core 19.

When the main transformer 6 and the main interrupter 7 are interrupted upon occurrence of a failure on the electric grid system 8 or in the electric generator 5, the load shutdown detection device 13 receives a shutdown signal from the main transformer 6, and causes the main steam control valve 3 to be abruptly closed, while at the same time, causes the bypass valve 11 to be abruptly opened, allowing the steam from the nuclear reactor 1 to be discharged into the condenser 9. On the other hand, as described above, the primary loop recirculation pump 15 is tripped as a result of the abrupt closing of the main steam control valve 3, and therafter, within approximately 30 seconds, the power level of the nuclear reactor 1 is lowered to 50–60% of the rated power thereof. Furthermore, the abrupt closure of the main steam control valve 3 causes the selected control rods inserting device 17 to subject a portion of the control rods 18S to a scram process within a few seconds, thus lowering the power level of the nuclear reactor 1 by an amount corresponding to approximately 30% of the rated power level. As described above, the tripping of the primary loop recirculation pump 15 and the scram of the control rods 18S lower the power level of the nuclear reactor 1 to 20–30% of the rated power level, and the steam generated within the nuclear reactor 1 is discharged through the bypass valve 11 into the condenser 9. The nuclear reactor 1 then shifts to the isolated grid operation which is the state in which the nuclear reactor 1 is separated form the electric grid system 8. In this state, the rise of water level L caused by the tripping of the primary loop recirculation pumps 15 is suppressed by the specified operation-trip of the feedwater pumps 10, so that the scram device 22 is not in danger of being operated.

Figure 7:
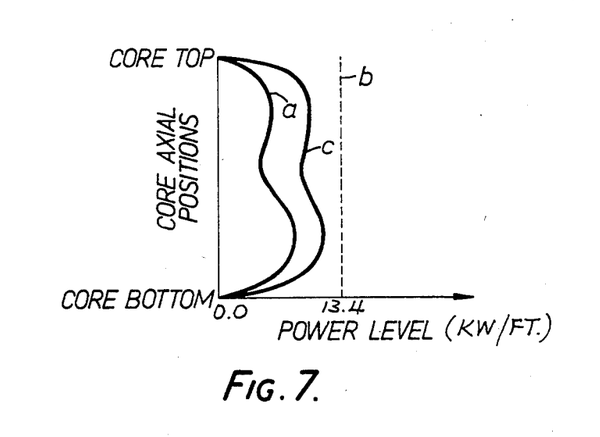
FIG. 7 is a graph illustrating the axial power level distribution according to the present invention.

As shown in FIG. 6A illustrating the control rod pattern during the rated power level operation of the nuclear reactor 1, in general, the control rods 18S are invariably at the full-out position, so that such deterioration of the neutron absorption capability thereof, that decreases in proportion to the operation period of the nuclear reactor 1, would rarely occur. As a result, the selected control rod inserting device 17 does not necessitate such alteration of the selecting control rods by subjecting them to a scram process for each cycle of operation as required in the conventional method. Thus, the specified negative reactivity may invariably be applied to the nuclear reactor 1 merely by inserting the control rods 18S installed in the outermost peripheral region. Furthermore, the power distribution of the fuel channels surrounding the control rods 18S installed in the outermost peripheral region becomes lower in value due to the neutron leakage, external of the reactor core, as shown by the solid line a of FIG. 7. In FIG. 7, the value represented by the solid line a does not exceed at any instant the threshold value in the operation procedure for fuel preconditioning (the dotted line b).

Moreover, since the reactor core power level is sufficiently suppressed by insertion of the control rods installed in the outermost peripheral region, even when the control rods in the region inside the outermost periphery are fully withdrawn, the reactor core power value represented by the solid line c does not exceed the threshold value (the dotted line b) even though it beocomes higher than the power level that is generated when the control rods in the outermost periphery are withdrawn.

Therefore, after recovery of the failure on the electric grid system 8 and so forth, and when the nuclear power plant shifts from the isolated grid operation to the electric grid system operation, firstly the control rods installed in the region inside the outermost periphery that provide relatively high power levels are fully withdrawn so as to slightly increase the power level. Further, the selected control rods installed in the outermost peripheral region which are, as described above, provided with a larger margin than the inner ones in terms of the threshold in the operation procedure, are orderly withdrawn to the full-out positions. Thus, the control rods previously subjected to a scram process may be withdrawn with a sufficient margin in terms of both the thermal limit value of the fuels and the above-described threshold value, whereby the initial control rod pattern may be smoothly restored.

On the other hand, in case of a failure of the feedwater pumps 10 during normal operation of the nuclear reactor 1, the abnormalities thereof are detected by the feedwater-pump abnormal operation detecting device 25. This causes the select control rod inserting device 17 to subject both a portion of the outermost control rods and a portion of the fully withdrawn control rods selected from the control rods in the region inside the outermost periphery to a scram process. Thus, the power level of the nuclear reactor 1 is lowered by approximately 30% of the rated power level. The operation is then continued with the feedwater capability of the remaining feedwater pumps except for the failed one. After recovery of the failed feedwater pump, the withdrawal of the selected control rods subjected to the scram prcoess can, in the same manner as that of recovery from the isolated grid operation, perform power restoration with independence from the thermal limit values of fuels and so forth.

Figure 8:
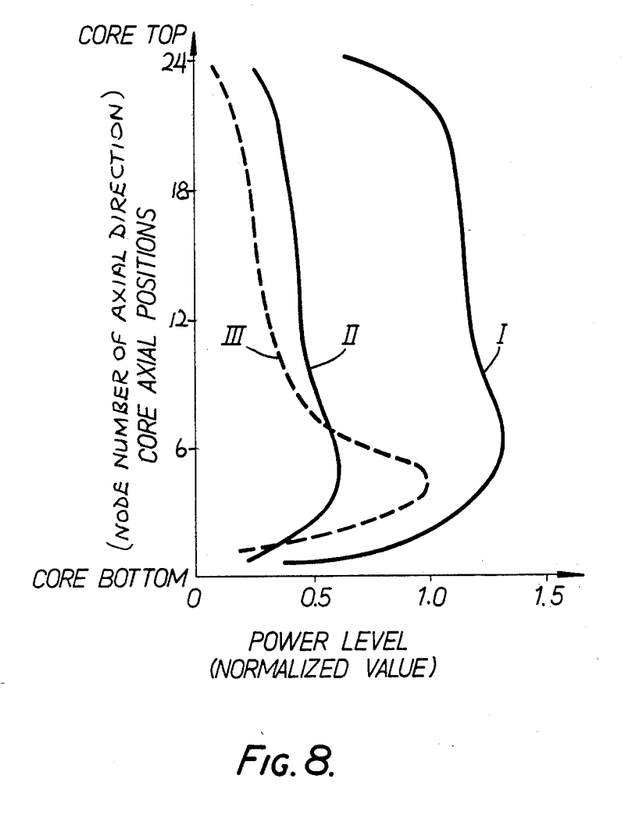
FIG. 8 is a graph illustrating a comparison of the present invention and prior art axial power distribution before and after insertion of the selected control rods.

According to the present invention, the control rods partially inserted during the normal operation are not selected as the selected control rods. This has a significantly great advantage in that the axial power distribution during the normal opration is not drastically changed even when the selected control rods are subjected to a scram process. In FIG. 8, the solid line I represents the axial power distribution under normal operation, the solid line II the power distribution after insertion of the selected control rods when performed according to the present invention, and the dotted line III the power distribution when insertion of the selected control rods is performed in such a manner as to select the partially inserted rods shown in FIG. 6A, respectively. As described above, the control rods in the full-in position tend to downwardly distort the axial power distribution, and when such partially inserted control rods are subjected to a scram process as shown in FIG. 6A, this tendency is enhanced so as to increase extreme downward power level peaking as shown by the dotted line III in FIG. 8.

Figure 9:
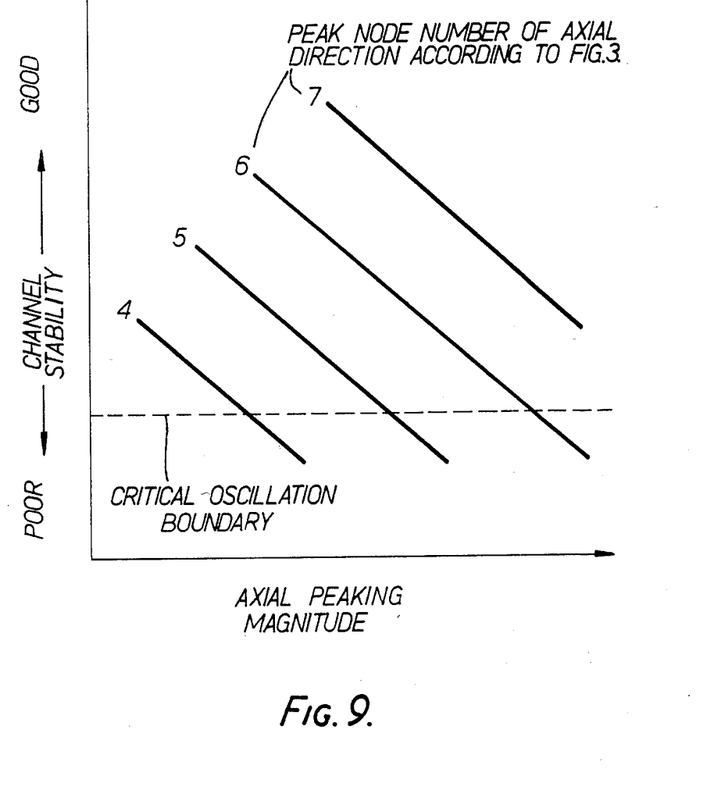
FIG. 9 is a graph illustrating the relationship between downward distortion of the nuclear reactor power and the stability hereof in accordance with the present invention.

This phenomenon is unfavorable with respect to stability, and in the worst case, a self-oscillation can occur within the nuclear reactor, so that even after the shift to the isolated grid operation is made, the nuclear reactor inevitably reaches the scram status. FIG. 9 shows the qualitative relationship between the coefficient of axial peaking factor and the channel stability, wherein the peak mode of axial direction are illustrated as parameters (nodes; the smaller the numerals, the more downward the peakings). In FIG. 9, when the degree of channel stability becomes lower than critical oscillation boundary represented by a dotted line, the coolant in the core can oscillate and become almost uncontrollable. After the scram process has once occurred, an extremely long time period compared with the time required to perform the shift from the isolated grid operation to the normal operation (electric grid system operation) is required to resume the start-up needs, and this causes the power plant load factor to be lowered.

By contrast, according to the present invention, the control rods partially inserted during the normal operation remain at the original positions thereof even after the select control rods are subjected to a scram process, and function so as to raise the axial power distribution that tends to be downwardly distorted due to the scram of the selected control rods. As a result, the distribution represented by the solid line II in FIG. 8, which is only slightly different than that of the normal operation, can be achieved. This allows the stability of the isolated grid operation to be remarkably enhanced.

Moreover, all of the selected control rods subjected to a scram process can, in the process of restoring from the failure, merely be withdrawn from the full-in position to the full-out position in conformity with the predetermined sequential procedures, so that the maneuvers of the control rods become extremely simplified.

As described above, according to the present invention, the nuclear reactor is allowed to abruptly shift to the isolated grid operation upon occurrence of failure, and this can be achieved on the basis of such determination that the selected control rods to be subjected to a scram process into the core are selected both from a portion of the control rods installed in the outermost peripheral region of the core and from a portion of the control rods which are installed in the region inside the outermost periphery and fully withdrawn under the normal operation state. As a result, the alteration of the selected control rods to be subjected to a scram process, which is required in conjunction with the progress of the cycle, may be limited to a relatively smaller extent, so that the manipulating procedures thereof can be extremely simplified. Moreover, the axial power distribution in the process of power recovery after restoration of the failure cannot be distorted, so that the isolated grid operation can be continued in a highly stable manner. Furthermore, even in the case of a failure in one of the feedwater pumps, the selected control rods are allowed to be operated, so that the continuous operation of the nuclear reactor with a lower power level may be achieved without an interruption of the nuclear reactor per se, and after restoration of the failure, the shift to the normal operation may be performed in a short time without any deterioration of fuel integrity.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of safely operating a boiling water nuclear reactor power plant upon the occurrence of a failure, said reactor being changeable between several non-failure conditions and a plurality of failure conditions and having control rods for controlling the power level thereof, said control rods including a first group having all rods in the outermost peripheral region of said nuclear reactor and a second group having all rods not in the outermost peripheral region, said method comprising the steps of:

identifying a failure as a failure which occurs outside said power plant;

selecting control rods from said first group that are in a fully withdrawn position and that do not adjoin each other during normal operation;

selecting control rods only from those control rods in said second group which are in a fully withdrawn position and which are spaced from each other at a distance greater than the distance between adjoining rods during normal operation of said nuclear reactor;

said selected control rods from said first group and said second group being selected on the basis that if scrammed, the axial power distribution and natural circulation flow are maintained in a stable condition so that the power plant may operate at a reduced power level;

subjecting said selected control rods from said first group and said second group to a scram, whereby the power level of said nuclear reactor power plant is reduced to a power level lower than the normal operating power level but large enough to supply the needs of the power plant itself so that said nuclear reactor power plant can continue operating.

2. The method of operating according to claim 1, wherein said reduced power level is about 20% to 30% of the rated power level.

* * * * *